(12) United States Patent
Trabandt et al.

(10) Patent No.: US 9,623,642 B2
(45) Date of Patent: Apr. 18, 2017

(54) VIBRATION WELDING MACHINE AND METHOD FOR OPERATING A VIBRATION WELDING MACHINE

(71) Applicants: Tim Trabandt, Neuffen (DE); Michael Jauch, Moessingen (DE); Thorsten Koch, Metzingen (DE)

(72) Inventors: Tim Trabandt, Neuffen (DE); Michael Jauch, Moessingen (DE); Thorsten Koch, Metzingen (DE)

(73) Assignee: bielomatic Leuze GmbH & Co. KG, Neuffen (DE)

( * ) Notice: Subject to any disclaimer, the term of this patent is extended or adjusted under 35 U.S.C. 154(b) by 421 days.

(21) Appl. No.: 14/376,283

(22) PCT Filed: Mar. 15, 2013

(86) PCT No.: PCT/EP2013/055473
§ 371 (c)(1),
(2) Date: Aug. 1, 2014

(87) PCT Pub. No.: WO2013/135893
PCT Pub. Date: Sep. 19, 2013

(65) Prior Publication Data
US 2015/0020951 A1    Jan. 22, 2015

(30) Foreign Application Priority Data

Mar. 16, 2012 (DE) .................. 10 2012 204 188

(51) Int. Cl.
*B32B 37/00* (2006.01)
*B29C 65/00* (2006.01)
(Continued)

(52) U.S. Cl.
CPC ........ *B32B 37/003* (2013.01); *B29C 65/0618* (2013.01); *B29C 66/8242* (2013.01);
(Continued)

(58) Field of Classification Search
CPC ... B32B 37/003; B32B 37/04; B29C 65/0618; B29C 66/8242; B29C 66/8244; B29C 66/8322
(Continued)

(56) References Cited

U.S. PATENT DOCUMENTS 4,086,122 A    4/1978    Bouyoucos
4,154,641 A    5/1979    Hotton
(Continued)

FOREIGN PATENT DOCUMENTS

DE        4034821 B      5/1992
EP        1834754 A      9/2007

*Primary Examiner* — James Sells
(74) *Attorney, Agent, or Firm* — Andrew Wilford

(57) ABSTRACT

The invention relates to a vibration welding machine (1), comprising an upper tool (2) and a lower tool (3), wherein the two tools (2, 3) each accommodate a respective welding part (4, 5), which welding parts are intended to be joined by means of vibration, and means for producing vibrations are provided, which cause at least the upper tool (2) to vibrate, wherein the means for producing vibration are designed as a stationary part, in particular an upper carrier (9), and a part arranged thereon in such a way that said part can oscillate, in particular an oscillator (11), which accommodates the upper tool (2), wherein furthermore means are provided that remove the air located in an air gap (15) formed between the stationary part, in particular the upper carrier (9), and the part that can oscillate, in particular the oscillator (11).

10 Claims, 1 Drawing Sheet

(51) Int. Cl.
    *B29C 65/06*         (2006.01)
    *B32B 37/04*         (2006.01)
    B29C 65/78         (2006.01)
    B32B 38/00         (2006.01)

(52) U.S. Cl.
    CPC ...... *B29C 66/8244* (2013.01); *B29C 66/8322* (2013.01); *B32B 37/04* (2013.01); *B29C 65/7841* (2013.01); *B29C 66/8742* (2013.01); *B29C 66/9513* (2013.01); *B29C 66/9517* (2013.01); *B32B 2038/0052* (2013.01); *B32B 2309/12* (2013.01); *B32B 2309/68* (2013.01)

(58) Field of Classification Search
    USPC ...................................... 156/73.5, 73.6, 580
    See application file for complete search history.

(56) References Cited

U.S. PATENT DOCUMENTS

| | | | | |
|---|---|---|---|---|
| 4,963,216 | A | * | 10/1990 | Watkins .................. B23P 19/04 156/291 |
| 7,044,185 | B2 | * | 5/2006 | Murayama .............. B29C 66/02 156/285 |
| 2012/0168057 | A1 | * | 7/2012 | Kanamoto .......... B29C 65/0618 156/73.1 |

\* cited by examiner

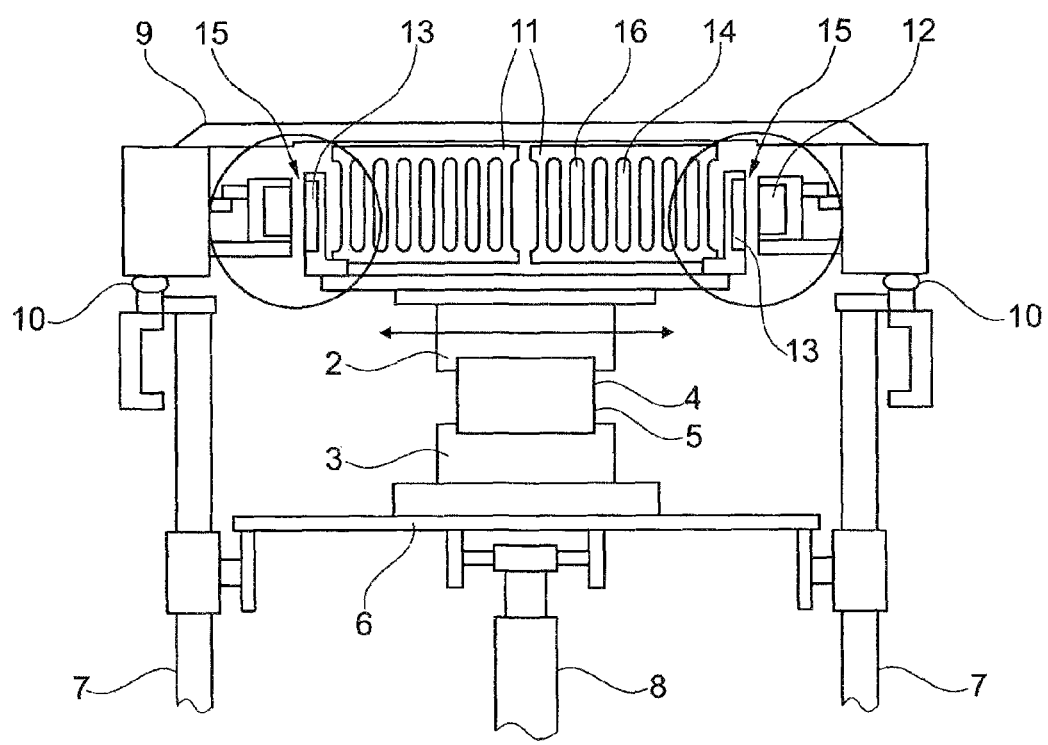

VIBRATION WELDING MACHINE AND METHOD FOR OPERATING A VIBRATION WELDING MACHINE

CROSS REFERENCE TO RELATED APPLICATIONS

This application is the US-national stage of PCT application PCT/EP2013/055473 filed 15 Mar. 2013 and claiming the priority of German patent application 102012204188.5 itself filed 16 Mar. 2012.

The invention relates to a vibration welder and to a method of operating such a vibration welder, according to the features of the respective preambles to the independent claims.

Vibration welders and methods for operating vibration welders of the kind that have a top tool and a bottom tool, wherein respectively one of the two tools respectively receives a welding part, which two welding parts are due to be permanently and non-detachably connected to each other in the region of a joining zone by vibration welding, are known. The welding parts generally consist of plastic and can, where necessary, apart from being set in oscillation, also be heated in order to improve the joining process. In such vibration welders, one of the tools, for instance the bottom tool, is fixedly disposed and the other tool, for instance the top tool, is set in oscillation, so that the joining zones of the two tools rub one against the other, generate heat as they do so, and are thereby permanently joined together in the region of this joining zone once the vibration welding process is ended. The structure of such vibration welders is fundamentally known, said machines being used in the series production of components consisting of at least two welding parts. In particular, such vibration welders are used for the series production of components in large quantities, in which case also several vibration machines are often found standing in a production hall.

Because of the moving parts, a noise development, which is detrimental to the operating staff, materializes during the joining process. In order to reduce the noise development, it has already been envisioned to surround the complete vibration welder with a complete soundproofing enclosure. However, due to the high noises, in particular the high-frequency noises, generated in the course of the vibration welding, said soundproofing enclosure must be of complex construction in order to significantly reduce the noise development during the vibration welding for the operating staff. Moreover, such a sound enclosure, specifically in the series production of components, has the drawback that it must be repeatedly removed once the one component is ready joined and two new welding parts are due to be inserted into the machine. Moreover, thick soundproofing enclosures of this kind, with which the generated sound is intended to be effectively reduced, are costly and occupy a large installation space.

The object of the invention is therefore to improve a vibration welder and a method of operating such a vibration welder such that, in particular during the vibration welding process, the herein generated noises can be significantly reduced without great effort or expense.

This object is achieved by the features of the independent patent claims.

According to the invention, with respect to the vibration welder, it is provided that the vibration generating means are configured as a fixed top beam and an oscillator, arranged in an oscillatingly movable manner thereon, which receives the top tool, wherein, furthermore, means that remove the air present in an air gap formed between the top beam and the oscillator are provided. It has become apparent that, in vibration welders, fixed and oscillatingly movable parts exist, wherein the oscillatingly movable part is oscillatingly moved relatively with respect to the fixed part. In order that an oscillatory motion of this kind is enabled, it is necessary to provide an air gap between the fixed part and the oscillatingly movable part.

As a result of this air gap, a space is obtained in which the oscillatingly movable part can move relative to the fixed part. However, the oscillatory motion also gives rise to an excitation of the air volume in the air gap, so that undesirable high noises are thereby generated. The term "high" here relates not only to the frequency, but also to the noise level that can assume undesirable or even inadmissible values. The invention therefore proposes that means that remove the air present in an air gap between these two parts are provided. By the term "remove" is understood that air is present in the air gap, which air is extracted, for example. Likewise, it should thereby be understood that measures are adopted, which measures prevent formation in the air gap of any significant air volume that could be excited by oscillations. Moreover, it can thereby be understood that the region of the air gap is sealed off from the external environment, so that, although an air volume is present in the air gap, because of the sealing either it is not induced to oscillate or, if it is, then, as a result of the sealing, the noise generation that is herein generated is effectively damped. All in all, as a result of the above-described measures, the noise levels can advantageously either be markedly reduced, or, in the best case, wholly prevented, at the site at which they are generated, so that the sound level of the entire vibration welder, while it is in work, is thereby significantly reduced without the need to invest great effort or expense.

In a refinement of the invention, the means with which the air present in the air gap is removed are configured as a seal around the air gap. This means that, by the fixed part and by the oscillatingly movable part, an air volume is formed in the air gap, and precisely this region that from the two parts forms the air gap is sealed off from the external environment. Consequently, although an air volume is present between the two parts and, as a result of the motion of the oscillatingly movable part, is also induced to oscillate, these noises advantageously do not penetrate outward.

In a refinement of the invention, the means for removing the air present between the air gap are configured as a housing around the air gap. For instance, the oscillatingly movable part, inclusive of the fixed part present around it, can be surrounded by a housing, wherein, although the air in the air gap is excited due to the oscillatory motion of the movable part, at the same time the sound that is hereupon generated cannot be delivered to the external environment. Such a housing can turn out to be substantially smaller than a complete enclosure of the vibration machine, so that the noise level can thereby advantageously be reduced with simple means. The housing can be designed very simply, only an oscillatingly movable, elastic or similarly configured seal having to be made between the fixed housing and the oscillatingly movable part. Moreover, this housing does not hamper series production, since essentially only the oscillatingly movable part is surrounded by the housing, whereas its tool, to which one welding part is fastened, is freely accessible.

Alternatively or in addition to the sealing of the region that forms the air gap, or of an additional region that surrounds the air gap, it is conceivable for the means to be configured as underpressure-generating means, with which the air present at least in the air gap is extracted. As a result of such a subatmospheric pressure that is generated by appropriate means (such as, for example, a vacuum pump or the like), either the air volume that is present in the air gap between the oscillatingly movable and the fixed part can specifically be extracted. In addition, it is conceivable also to extract the air volume around the air volume that is present in the air gap in order to avoid the possibility of it being excited by the oscillatory motion and a disturbing noise level being disadvantageously generated. In addition, it is conceivable either to seal off the air gap by a seal that still permits the oscillatory motion, or to seal off the fixed part and the oscillatingly movable part by a housing around them and, at the same time, to generate a subatmospheric pressure in these sealed-off regions or indeed, specifically there, to extract the air present therein. In all cases, the air volume that is excited by the oscillatory motion and is thus responsible for the negative noise development is effectively reduced or fully removed, so that an excitation is no longer possible and the noise development is significantly reduced or fully eliminated.

The same applies to the method of operating such a vibration welder. According to the invention, it is provided in this respect that, through suitable method steps, the air present in the air gap between the oscillatingly movable and the fixed part and, if need be, also the air present around it, is removed. A situation in which this air, which in consequence of the oscillatory motion is responsible for an adverse noise development, generates a disturbing noise level is thereby effectively avoided. In a simple manner and with simple method steps, the negative noise development can thereby be avoided, while, at the same time, a complete enclosure of the vibration welder for soundproofing purposes can also be avoided. Moreover, in particular in the series production of welding parts to be joined together, a higher cycle time is possible, since it is no longer necessary, for the purpose of changing a welding part, to remove, and subsequently reinstall, the complete enclosure. The change of welding part (and, if need be, also a change of tool) can be made at any time without having to remove the complete enclosure for soundproofing purposes, because, according to the invention, advantageously that air volume is removed specifically at the site at which it is present and at which it would induce a negative noise level.

The inventive principle is based on a rapid linear deflection of a welding head (oscillator) in relation to a rigid table (top beam or lifting table). The frequency here amounts, for instance, to about 70 to 260 Hertz, preferably 180 to 240 Hertz, further preferably 200 to 240 Hertz. The amplitude goes up to 2 mm (oscillation amplitude up to 4 mm), preferably 1.5 mm (oscillation amplitude up to 3 mm), further preferably 1 mm (oscillation amplitude 2 mm).

In addition thereto, there is also a so-called low-frequency process variant. The frequency is then from 80 to 130 Hertz, preferably 100 to 120 Hertz, the amplitude up to 2 mm, maximally up to 2.5 mm.

The high-frequency variant is first of particular relevance, however, since here the sound source is louder.

The oscillating head is a resonance oscillator having a magnet-spring oscillation system. Strong magnets deflect the head. The spring creates the return travel.

It has become apparent that, in the air gap between oscillator and magnet, a principal sound source is situated. Here a large cushion of air is rapidly expelled, or sucked up. As a result, the air column is moved like a loud speaker and thus generates a large part of the sound emission (disturbing noise level).

The idea on which the invention is founded is now to remove the air from the gap, and thus the sound-transmitting medium or the medium of the sound generation.

The solution is the principle of an evacuated gap on the oscillating head for the avoidance of sound generation or for the avoidance of sound emission. For the purpose of further noise reduction, the volume of the gap can be realized by volume enlargement in the area of the region surrounding the gap in order to reduce the compression rate. The enlargement is constituted, for example, by bores, pockets and the like.

Another possible solution is simply the generation of a subatmospheric pressure (vacuum is, of course, also a particular form of subatmospheric pressure) or the targeted extraction of the escaping air in order that no dispersion takes place in all directions, but rather the surrounding air column remains uninfluenced.

The vibration welder according to the invention, and the method according to the invention, are further explained below with reference to a schematic diagram in the single FIGURE.

In a schematic diagram, 1 denotes a vibration machine comprising, as an oscillatingly movable part, at least one top tool 2, and as a fixed part, at least one bottom tool 3. By means of these two tools 2, 3, two welding parts 4, 5 are held (clamped there or the like) in order to move them closer together and set them in vibration. By means of this vibration, frictional heat is generated in the region of the appropriate joining zones of the two welding parts 4, 5, so that they are joined together there and remain permanently connected when they are removed again from the two tools 2, 3. Preferably, as the welding parts 4, 5, components prefabricated from appropriate plastic are used and joined together, though the use of other parts that are made up of appropriate components and can be joined together by a vibration welding process is not precluded. If need be, welding parts made of a metallic material can also be used (friction welding process).

In order to be able to insert the two welding parts 4, 5 into the two tools 2, 3 and move these same, the vibration welder 1 further has a lifting table 6, that is linearly movable, for instance, on guide pillars 7. This motion is realized by a table drive 8, for instance an electric drive, a hydraulic drive or the like. This lifting table 6 and its table drive 8 enable the two tools 2, 3 to initially be moved further apart (in the linear direction) in order to be able to insert there, into their associated tools 2, 3, the two welding parts 4, 5 to be mutually connected. Once this has been done, the table drive 8 transports the lifting table 6, as the FIGURE is viewed, upward in the direction of the facing top tool 2 with the welding part 4 clamped therein, so that the mutually facing joining zones of the two welding parts 4, 5 come into contact. If need be, this linear motion of the lifting table 6 can be tracked during the vibration welding process (as described further below).

The oscillatingly movable part of the vibration machine 1 comprises a top beam 9, which in this case is disposed via a bearing 10, if need be an elastic bearing, on the guide pillars 7. Alternatively thereto, it is conceivable, of course, to arrange the top beam 9 also elsewhere on the vibration welder 1 (not represented here). A fixed arrangement of the fixed part, here the top beam 9, is of importance to the vibration welding process. For an oscillatingly movable part, here an oscillator 11, is arranged relative to this fixed part (top beam 9), the top tool 2 being arranged on the oscillator 11 to receive the one welding part 4. The oscillatingly movable part, here the oscillator 11, is set essentially into an oscillatory motion, for which purpose appropriate drive means are present. In the vibration machine 1 shown in the FIGURE, these vibration generating means are configured as resonance oscillators having a magnet-spring oscillation system. This means that, on the top beam 9, at least one electromagnetic coil 12 (here 2 oppositely arranged electromagnetic coils 12), and on the oscillator 11, at least one accordingly associated magnet 13, here 2 magnets 13 fastened opposite each other to the outside of the oscillator 11, are present. Moreover, in support of the vibration welding process, a spring assembly 14 is present in the oscillator 11. As a result, the oscillator 11 or, in general terms, an oscillatingly movable part, also termed an oscillating head, is formed. In order that this oscillator 11 can be moved oscillatingly to and fro between the electromagnetic coils 12, it is necessary that an air gap 15 is present between the respective electromagnetic coil 12 (fixed) and the associated magnet 13 (movable). This air gap enables a movement of the oscillator 11 between the electromagnetic coils 12. It has here become apparent during operation of such vibration welders 1 that the air volume present in the air gaps 15 can be excited due to the to-and-fro motion of the oscillator 11, whereby the above-described detrimental disturbing noises arise. At this point, the invention sets in and enables a removal of the air volume into the air gap 15 or, in the embodiment of the vibration machine 1 according to the FIGURE, between the two air gaps 15. Should it transpire that also at least one air gap 16, in particular a plurality of air gaps, of the spring assembly 14 generate disturbing noises as a result of the oscillatory motion, the removal of the air volume in this air gap or in the plurality of air gaps 16 can be envisioned there also. The means for removing the air volume in the air gap 15 can be configured as a seal precisely around the air gap 15. This means that a, for instance, elastic deformable seal, a bellows or the like is arranged around between the electromagnetic coil 12 and the associated magnet 13. This enables that the oscillator 11 can still move relative to the top beam 9, while at the same time the detrimental formation of noises as a result of the excitation of the air volume in the air gap 15 is prevented. That is to say that, in this context, the term "removal" should be understood such that although air is still present in the air gap 15, the excited air is prevented from generating disturbing noises in consequence of the oscillatory motion. The same also applies where the means for removing the air are configured as a housing around the air gap 15. This means that, for instance, around a larger region around the electromagnetic coil 12 and the associated magnet 13, a housing can be provided, which housing produces a seal against the external environment in order to reduce or wholly isolate disturbing noises. In addition thereto, the entire region around the top beam 9 can also, for instance, be sealed off with a housing from the rest of the vibration welder 1 in order to reduce or eliminate a disturbing noise development in this region in which the oscillatingly movable parts are found. In such a case, it must be ensured, however, that the housing surrounding the top beam 9 has a cutout from which the top tool 2 can protrude. In this case, it must advantageously be ensured that the top tool 2 is acoustically sealed off from the cutout of the housing likewise by an elastic seal, a bellows or the like. For the above-described variants, it can also be envisioned to remove the air from the air gap 15 and, if need be, from regions around it, without additional acoustic sealing measures, through the targeted extraction of said air or the operation of these regions in a subatmospheric pressure.

All in all, the invention thus provides that the region between the oscillatingly movable part and the fixed part of the vibration welder in which disturbing noises are generated in consequence of the oscillatory motion is acoustically sealed off from the external environment by appropriate measures. These shall include both mechanical devices (such as, for example, the described housing) and the removal of the air volume at least in the air gap (or, if need be, around it) by extraction measures or by subatmospheric pressure.

In addition thereto, it can supportively be envisioned that the entire vibration welder is operated with subatmospheric pressure, with the result that in the air gap there is no air volume or no significant air volume present that could generate disturbing noises in consequence of the vibration welding.

| Reference symbol list | |
|---|---|
| 1 | vibration welder |
| 2 | top tool |
| 3 | bottom tool |
| 4 | welding part |
| 5 | welding part |
| 6 | lifting table |
| 7 | guide pillar |
| 8 | table drive |
| 9 | top beam |
| 10 | bearing |
| 11 | oscillator |
| 12 | electromagnetic coil |
| 13 | magnet |
| 14 | spring assembly |
| 15 | air gap |
| 16 | air gap |

The invention claimed is:

1. A vibration welder comprising:
a top tool and a bottom tool holding respective welding parts to be joined together by vibration, and
vibration generating means that set at least the top tool in vibration and that include
a fixed part,
a part arranged in an oscillatingly movable manner thereon,
means that remove the air present in an air gap formed between the fixed part and the oscillatingly movable part.

2. The vibration welder as claimed in claim 1, wherein the air-removing means are configured as a seal around the air gap.

3. The vibration welder as claimed in claim 1, wherein the air-removing means are configured as a housing around the air gap.

4. The vibration welder as claimed in claim 1, wherein the air-removing means are configured as underpressure-generating means that extract air present at least in the air gap.

5. The vibration welder as claimed in claim 1, wherein the vibration generating means are configured as resonance oscillators having a magnet-spring oscillation system.

6. The vibration welder as claimed in claim 5, wherein the magnet-spring oscillation system comprises
at least one electromagnetic coil arranged on the top beam and
a therewith cooperating magnet arranged on the oscillator.

7. A method of operating a vibration welder having a top tool and a bottom tool adapted to hold respective welding parts to be joined together by vibration, and vibration generating means that set at least the top tool in vibration that include a fixed top beam carrying the top tool and an oscillator arranged in an oscillatingly movable manner thereon, the method comprising the step of removing air present in an air gap formed between the top beam and the oscillator.

8. The method as claimed in claim 7, wherein the air present in the air gap is extracted.

9. The method as claimed in claim 7, wherein at least the region in which is found the top beam with the oscillator is encased, and in the region of the encasement a subatmospheric pressure is generated.

10. The method as claimed in claim 7, wherein the entire vibration welder is operated in a subatmospheric pressure.

\* \* \* \* \*